United States Patent
Beck

(10) Patent No.: US 7,178,334 B2
(45) Date of Patent: Feb. 20, 2007

(54) HYDROSTATIC VEHICLE DRIVE SYSTEM COMPRISING A DIFFERENTIAL LOCK

(75) Inventor: Jochen Beck, Ulm (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 511 days.

(21) Appl. No.: 10/332,162

(22) PCT Filed: May 7, 2001

(86) PCT No.: PCT/EP01/05164

§ 371 (c)(1),
(2), (4) Date: Jan. 3, 2003

(87) PCT Pub. No.: WO02/02364

PCT Pub. Date: Jan. 10, 2002

(65) Prior Publication Data
US 2005/0072146 A1    Apr. 7, 2005

(30) Foreign Application Priority Data
Jul. 5, 2000   (DE) ................................ 100 32 514

(51) Int. Cl.
*F16D 31/02* (2006.01)
(52) U.S. Cl. .................... 60/424; 60/445; 180/6.48; 180/308
(58) Field of Classification Search ............... 60/424, 60/485, 484, 486, 445; 180/6.48, 308
See application file for complete search history.

(56) References Cited

U.S. PATENT DOCUMENTS 3,650,109 A    3/1972   Freeman
4,401,182 A *  8/1983   Pollman ........................ 60/445
4,481,769 A * 11/1984   Nagahara ...................... 60/445
4,554,992 A * 11/1985   Kassai .......................... 60/451
6,276,468 B1 * 8/2001   Essig et al. .................... 60/484

FOREIGN PATENT DOCUMENTS

| DE | 3346481 A1 | 7/1985 |
| DE | 19833942 A1 | 2/2000 |
| EP | 0226844 A1 | 11/1986 |

* cited by examiner

*Primary Examiner*—F. Danile Lopez
(74) *Attorney, Agent, or Firm*—Scully, Scott, Murphy & Presser, P.C.

(57) ABSTRACT

The invention relates to a hydrostatic vehicle drive system (1) comprising a first and a second hydraulic pump (2, 3), and a first and a second hydraulic motor (7, 12). Said hydraulic pumps (2, 3) and said hydraulic motors (7, 12) are coupled in such a way in a differential lock operation that a first connection (14) of the first hydraulic pump (2) is connected to a first connection (8) of the first hydraulic motor (7); a second connection (6) of the first hydraulic motor (7) is connected to a first connection (10) of the (10) of the second hydraulic pump (3); a second connection (9) of the second hydraulic pump (3) is connected to a first connection (13) of the second hydraulic motor (12); and a second connection (11) of the second hydraulic motor (12) is connected to a second connection (5) of the first hydraulic pump (2). The absorption volume of the first hydraulic motor (7) and the second hydraulic motor (12) can be respectively adjusted by means of an adjusting device (20, 21).

5 Claims, 1 Drawing Sheet

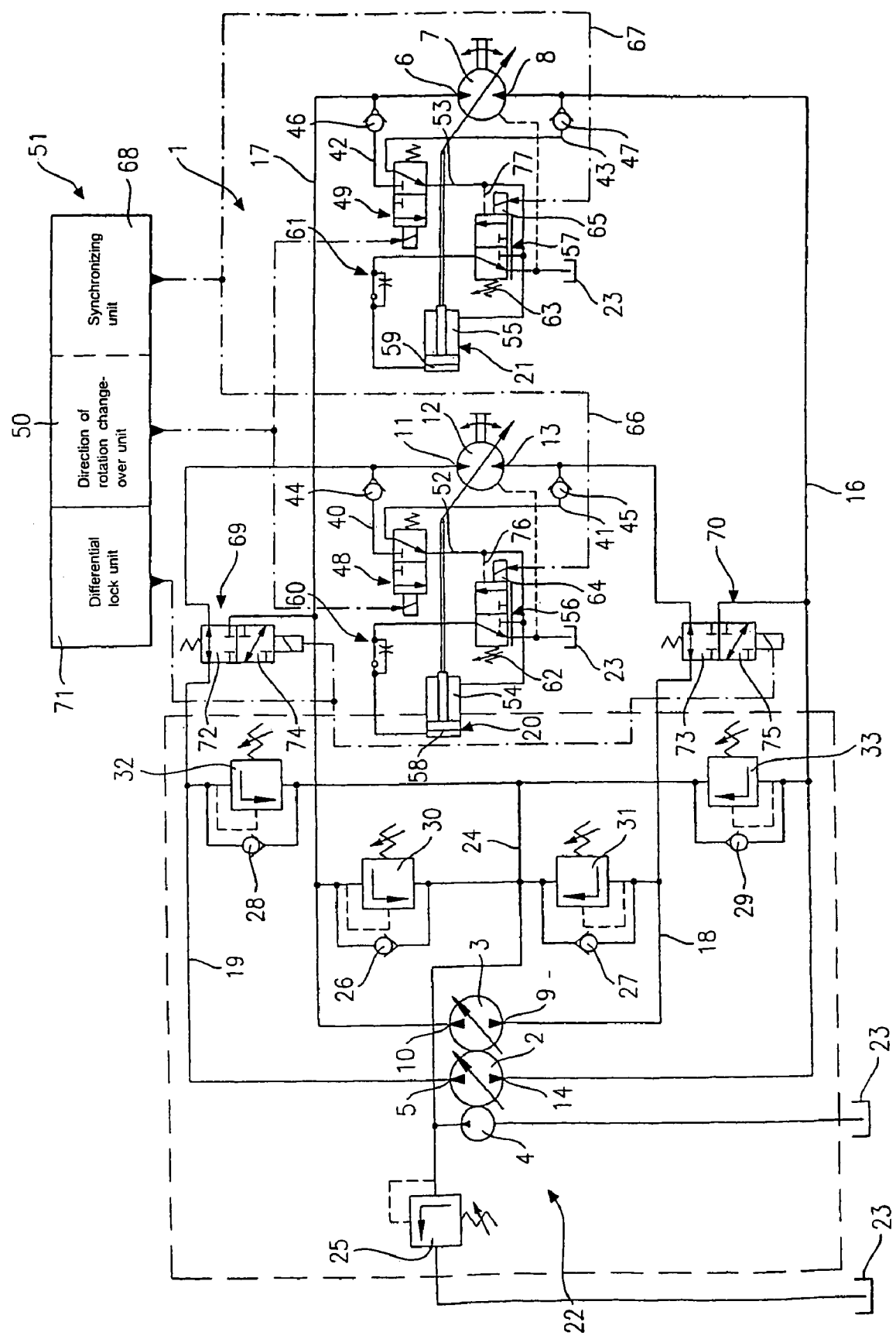

HYDROSTATIC VEHICLE DRIVE SYSTEM COMPRISING A DIFFERENTIAL LOCK

The invention relates to a hydrostatic vehicle drive system comprising a differential lock.

A hydrostatic vehicle drive system according to the preamble of claim 1 is already known from DE 198 33 942 A1. Two hydraulic pumps are cross-connected to at least two hydraulic motors in the hydrostatic vehicle drive system which is disclosed in this publication, so that the first hydraulic pump, the first hydraulic motor, the second hydraulic pump and the second hydraulic motor are in each case arranged in series in differential lock mode in the working circuit. The series arrangement of the hydraulic pumps and hydraulic motors has the advantage of the same volumetric flow flowing through both hydraulic motors and the latter of necessity having the same output speed with the same absorption volume. This means that there is no slip at either of the two separate drive trains which are driven by the hydraulic motors. This publication also describes the changeover between the differential lock mode described above and an unlocked differential mode, in which the hydraulic pumps and the hydraulic motors are arranged in parallel with one another. However all the hydraulic motors which are described in this publication are so-called fixed displacement motors with a prefixed, invariable absorption volume. Adjusting devices for adjusting the absorption volume of the hydraulic motors are not used in the hydrostatic vehicle drive systems which are disclosed in this publication.

The fact that the absorption volume of the hydraulic motors of the vehicle drive system described in DE 198 33 942 A1 is constant entails the disadvantage of the transmission ratio of the hydrostatic transmission, which is determined by the ratio of the absorption volume of the hydrostatic motors to the volumetric delivery of the hydrostatic pumps, only being variable by changing the volumetric delivery of the hydrostatic pumps. The range of variation is therefore limited. However a large range of variation of the transmission ratio is desirable, especially for construction machinery, e.g. for front-end loaders, as a relatively low transmission ratio with a high torque is required when working on a building site, while a relatively high transmission ratio with a high output speed is required for road transport.

The object of the invention is therefore to broaden the range of variation of the transmission ratio of a hydrostatic transmission according to the preamble of claim 1.

The object is achieved by the characterizing features of claim 1 in conjunction with the features constituting the preamble. The subclaims comprise advantageous developments of the invention.

The proposal according to the invention lies in enabling the absorption volume of the—at least—two hydraulic motors in the working circuit to be varied and providing the hydraulic motors with an adjusting device. This enables a greater range of variation of the transmission ratio of the hydrostatic transmission to be achieved.

A synchronizing mechanism which synchronizes the adjustment of the adjusting devices of the hydraulic motors is advantageously provided. As the hydraulic motors are arranged in series in differential lock mode in the working circuit, the hydraulic motors should generally drive at the same speed. This is only guaranteed if the two hydraulic motors have the same absorption volume, this being ensured by the synchronizing mechanism. The synchronizing mechanism may comprise, for example, an electrically operable servo valve, which is connected upstream of each adjusting device, and an electronic control unit, which activates the servo valves of the hydraulic motors in synchronism. The electrical activation simplifies the synchronizing process.

It is preferable to additionally provide an actuating pressure regulation system which increases the absorption volume of the associated hydraulic motor when the pressure in the working circuit upstream of the associated hydraulic motor rises. The associated hydraulic motor is thereby slewed further to produce a greater torque when the hydrostatic vehicle drive system is offered a resistance, for example when a front-end loader moves the bucket into a heap of debris. The actuating pressure regulation system and the synchronizing mechanism can in this case use the same servo valves.

The two hydraulic pumps are preferably only connected in parallel with one of the two hydraulic motors in unlocked differential mode. This increases the range of variation of the transmission ratio. It is possible to dispense with the additional torque of the second hydraulic motor for road transport mode.

An embodiment of the invention is described in detail in the following with reference to the drawing. The sole FIGURE shows a schematic hydraulic circuit diagram of an embodiment of the hydrostatic vehicle drive system according to the invention.

The hydrostatic vehicle drive system according to the invention is designated as a whole by the reference character 1. A first hydraulic pump 2, which is formed as a variable displacement pump, a second hydraulic pump 3, which is likewise formed as a variable displacement pump, and an auxiliary pump 4 are driven by a drive motor, for example an internal combustion engine, which is not represented. The first and second hydraulic pumps 2 and 3 and the auxiliary pump 4 are preferably arranged on a common drive shaft. Also provided are two hydraulic motors 7 and 12, which are likewise formed so as to be adjustable.

A first connection 14 of the first hydraulic pump 2 is connected via a working circuit section 18 to a first connection 8 of a first hydraulic motor 7. A second connection 6 of the first hydraulic motor 7 is connected via a working circuit section 17 to a first connection 10 of the second hydraulic pump 3. The second connection 9 of the second hydraulic pump 3 is hydraulically connected via a working circuit section 18 to a first connection 13 of a second hydraulic motor 12. However the second connection 11 of the second hydraulic motor 12 is hydraulically connected via a working circuit section 19 to the second connection 5 of the first hydraulic pump 2. The hydraulic pumps 2 and 3 and the hydraulic motors 7 and 12 are therefore arranged in series with one another in differential lock mode such that a hydraulic pump 2, 3 is in each case followed in the hydraulic working circuit 16–19 by a hydraulic motor 7, 12 and, vice versa, a hydraulic motor 7, 12 is in turn followed by a hydraulic pump 2, 3. The flow delivered by the hydraulic pumps 2 and 3 is therefore of necessity routed via both hydraulic motors 7 and 12, the later driving different drive trains, for example different driving wheels.

The measure according to the invention effectively prevents slip at either of the two drive trains, as the hydraulic motor 7, 12 connected to the corresponding drive train is incorporated in the hydraulic working circuit 16–19 such that the absorption volume of this hydraulic motor 7, 12 cannot increase without increasing the volumetric delivery of the two hydraulic pumps 2 and 3. Slip of the driven driving wheels or even racing of the driving wheels is therefore counteracted.

Also to be seen in the drawing is a feed mechanism which is designated as a whole by the reference character 22. The auxiliary pump 4 of the feed mechanism 22 draws hydraulic fluid from a hydraulic fluid tank 23 and feeds this into a feed line 24. The pressure in the feed line 24 is regulated to a constant level via a pressure limiting valve 25 connected to the hydraulic fluid tank 23. The hydraulic fluid which is to be delivered is fed into the sections 16–19 of the closed, hydraulic working circuit 16–19 which carry the low pressure at the time. Provision must be made in this respect for the line sections of the hydraulic working circuit 16–19 which carry the high pressure and low pressure to reverse when there is a reversal of the direction of rotation of the hydraulic motors 7, 12 and therefore a reversal of the direction of delivery of the two hydraulic pumps 2 and 3.

Pressure limiting valves 30 to 33 ensure that the pressure in the line sections 16–19 of the closed hydraulic working circuit which carry the high pressure at the time does not exceed a predetermined maximum value. If this maximum value is reached, the pressure limiting valve which is connected to this line section will open and discharge hydraulic fluid via the pressure limiting valve 25 to the hydraulic fluid tank 23.

Unlike a hydrostatic vehicle drive system of the type according to the preamble, the hydraulic motors 7 and 12 are each provided with an adjusting device 20 and 21, respectively, by means of which the absorption volume of the associated hydraulic motor 12 or 7 can be adjusted. For this purpose the section upstream and downstream of the hydraulic motor 12 and 7, respectively, is in each case connected via a respective connecting line 40, 41 and 42, 43, in which respective non-return valves 44, 45 and 46, 47 are arranged, to a direction of rotation and changeover valve 48 and 49, respectively.

In the embodiment the direction of rotation-changeover valves 48 and 49 can be electromagnetically activated and are connected to a direction of rotation changeover unit 50 of an electronic control unit 51. When the direction of rotation changes, the direction of rotation changeover valves 48 and 49 are each changed over so that the section upstream of the hydraulic motor 12 and 7, respectively, carrying high pressure at the time is connected to a connecting line 52 and 53, respectively. This connecting line 52 and 53, respectively, is directly connected to a first pressure chamber 54 and 55, respectively, of the adjusting device 20 and 21, respectively, of the associated hydraulic motor 12 and 7, respectively. This connecting line 52 is connected on the other side via a servo valve 56 and 57, respectively, and a non-return valve with parallel-connected throttles 60 and 61, respectively, to a second pressure chamber 58 and 59, respectively, of the adjusting device 20 and 21, respectively.

In the normal position which is represented the second pressure chamber 58 and 59, respectively, is connected via the servo valve 56 and 57, respectively, to the hydraulic fluid tank 23. The servo valve 56 and 57, respectively, compares the working pressure prevailing upstream of the respective hydraulic motor 12 or 7, which is applied via the control line 76 and 77, respectively, with a counterpressure which is exerted by an adjustable return spring 62 and 63, respectively. If there is a rise in the pressure in the working circuit upstream of the respective hydraulic motor 12 or 7, the second pressure chamber 58 or 59 will also be subjected to an increasing pressure, so that the associated hydraulic motor is slewed further to a greater absorption volume and therefore a greater torque. This regulation is necessary, for example, if a front-end loader which is provided with a vehicle drive system 1 according to the invention moves the bucket into a heap of debris and the vehicle drive system 1 is thus offered increased resistance, so that a higher output torque is required. An operating mode of this kind is not possible with hydraulic motors having a fixed absorption volume.

As the two hydraulic motors 7 and 12 are arranged in series in the hydraulic working circuit 16–19 in the differential lock mode described above, and the same volumetric delivery therefore flows through both hydraulic motors 7 and 12, the slewing angle of the hydraulic motors 7 and 12, which predetermines the absorption volume, must be synchronized via the adjusting devices 20 and 21, so that two hydraulic motors 12 and 7 of the same construction are always subject to the same slewing angle. For this purpose the servo valves 56 and 57 additionally comprise a respective electromagnetic 64 and 65, by means of which the servo valves 56 and 57 can be additionally acted upon against the return springs 62 and 63. The electromagnets 64 and 65 are connected via electric control lines 66 and 67 to a synchronizing unit 68 of the electronic control unit 51. Both electromagnets 64 and 65 are activated in the same way by means of the synchronizing unit 68 of the electronic control unit 51, so that the same slewing angle and therefore the same absorption volume are obtained at the hydraulic motors 12 and 7 as long as the actuating pressure regulation system described above, which monitors the pressure upstream of the hydraulic motors 12 and 7, does not respond. The actuating pressure regulation system described above may also be provided for both hydraulic motors 12 and 7 jointly. It is, however, of advantage to implement the actuating pressure regulation system separately for each hydraulic motor 12 and 7, for if just one drive train is blocked, only the pressure regulation system for this drive train responds.

The differential lock mode of the hydrostatic vehicle drive system 1 was described above. The embodiment which is represented in the drawing also has an unlocked differential mode. Differential lock changeover valves 69 and 70 effect a changeover between differential lock mode and unlocked differential mode. The differential lock changeover valves 69 and 70 are changed over by a differential lock unit 71 of the electronic control unit 51. When the differential lock changeover valves 69, 70 are in the switched position 72 or 73, the hydrostatic vehicle drive system 1 according to the invention is in the differential lock mode described above, in which the hydraulic pumps 2 and 3 and the hydraulic motors 12 and 7 are arranged in series in the working circuit 16–19.

When the differential lock changeover valves 69, 70 are in their switched positions 74 and 75, the hydrostatic vehicle drive system 1 according to the invention is in an unlocked differential mode. The two hydraulic pumps 2 and 3 are connected in parallel in this mode. The first hydraulic motor 7 is additionally connected in parallel with the two hydraulic pumps 2 and 3, while the second hydraulic motor 12 is separated from the working circuit 16–19. It would basically also be conceivable to connect the two hydraulic motors 7 and 12 in parallel with the two hydraulic pumps 2 and 3. According to the development of the invention, however, it is proposed that just one of the two hydraulic motors 7, 12, this being the hydraulic motor 7 in the embodiment, be connected in parallel with the two hydraulic pumps 2 and 3. This has the advantage of increasing the range of variation of the transmission ratio of the hydrostatic transmission in the direction of high speeds, as twice the volumetric delivery of the two parallel-connected hydraulic pumps 2 and 3 is only opposed by the single absorption volume of just one of the two hydraulic motors 7. A high output speed and therefore a high transport speed is desired in road transport mode, while the output torque becomes insignificant, so that there is no need for the torque of the second hydraulic motor 12.

The invention is not restricted to the represented embodiment and can be used, for example, with a great many other configurations of the adjusting devices 20, 21. It is also possible to connect more than two hydraulic pumps 2, 3 and hydraulic motors 7, 12 in series in differential lock mode or in parallel in unlocked differential mode.

The invention claimed is:

1. Hydrostatic vehicle drive system (1) comprising at least one first and one second hydraulic pump (2, 3) and at least one first and one second hydraulic motor (7, 12), wherein the hydraulic pumps (2, 3) and the hydraulic motors (7, 12) are coupled together in differential lock mode such that a first connection (14) of the first hydraulic pump (2) is connected to a first connection (8) of the first hydraulic motor (7), a second connection (6) of the first hydraulic motor (7) is connected to a first connection (10) of the second hydraulic pump (3), a second connection (9) of the second hydraulic pump (3) is connected to a first connection (13) of the second hydraulic motor (12), and a second connection (11) of the second hydraulic motor (12) is connected to a second connection (5) of the first hydraulic pump (2), the first hydraulic motor (7) and the second hydraulic motor (12) each having an absorption volume which is adjustable by a respective adjusting device (20, 21), including a synchronizing mechanism (68, 64, 65, 56, 57) which synchronizes the adjustment provided by the adjusting devices (20, 21) of the hydraulic motors (7, 12), at least one actuating pressure regulation system (56, 48; 57, 49) which increases the absorption volume of the associated hydraulic motor (12; 7) when there is a rise in the pressure in a working circuit (16–19) connecting the hydraulic pumps (2, 3) to the hydraulic motors (7, 12) upstream of a therewith associated hydraulic motor (20, 21), the actuating pressure regulation system (56, 48; 57, 49) comprising a servo valve (56, 57) which is connected upstream of each adjusting device (20, 21) and a control line (76, 77) which is connected to a working circuit section (18, 19; 16, 17) carrying the higher pressure of the working circuit (16–19) which connects the associated hydraulic motor (7; 12) to the hydraulic pumps (2, 3), and wherein each servo valve (56, 57) is connected via an electrically operable direction of rotation-changeover valve (48, 49) to the sections (18, 19; 16, 17) of the working circuit (16–19) which are connected to the associated hydraulic motor (7, 12).

2. Hydrostatic vehicle drive system according to claim 1, wherein the synchronizing mechanism (68, 64, 65, 56, 57) in each instance comprises an electrically operable servo valve (56, 57), which is connected upstream of each adjusting device (20, 21), and an electronic control unit (68), which activates the servo valves (56, 57) of the hydraulic motors (7, 12) in synchronism.

3. Hydrostatic vehicle drive system according to claim 1, wherein the servo valves (56, 57) of the actuating pressure regulation system (56, 48; 57, 49) are identical.

4. Hydrostatic vehicle drive system according to claim 1, wherein the first and second hydraulic pumps (2, 3) are connected in parallel with one of the two hydraulic motors (7) and the other hydraulic motor (12) is disconnected in differential unlocked mode.

5. Hydrostatic vehicle drive system according to claim 1, wherein the hydraulic motors (7, 12) drive separate drive trains.

* * * * *